June 28, 1960    G. LE ROY    2,942,469
SIGHT GLASS ASSEMBLY
Filed May 19, 1955    2 Sheets-Sheet 1
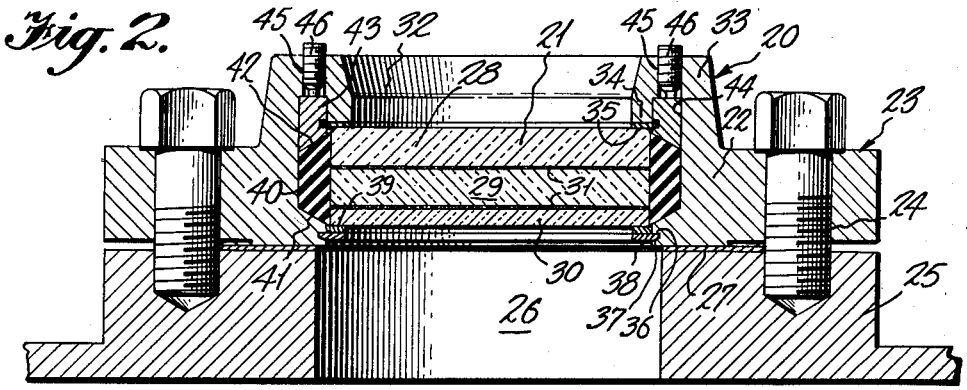
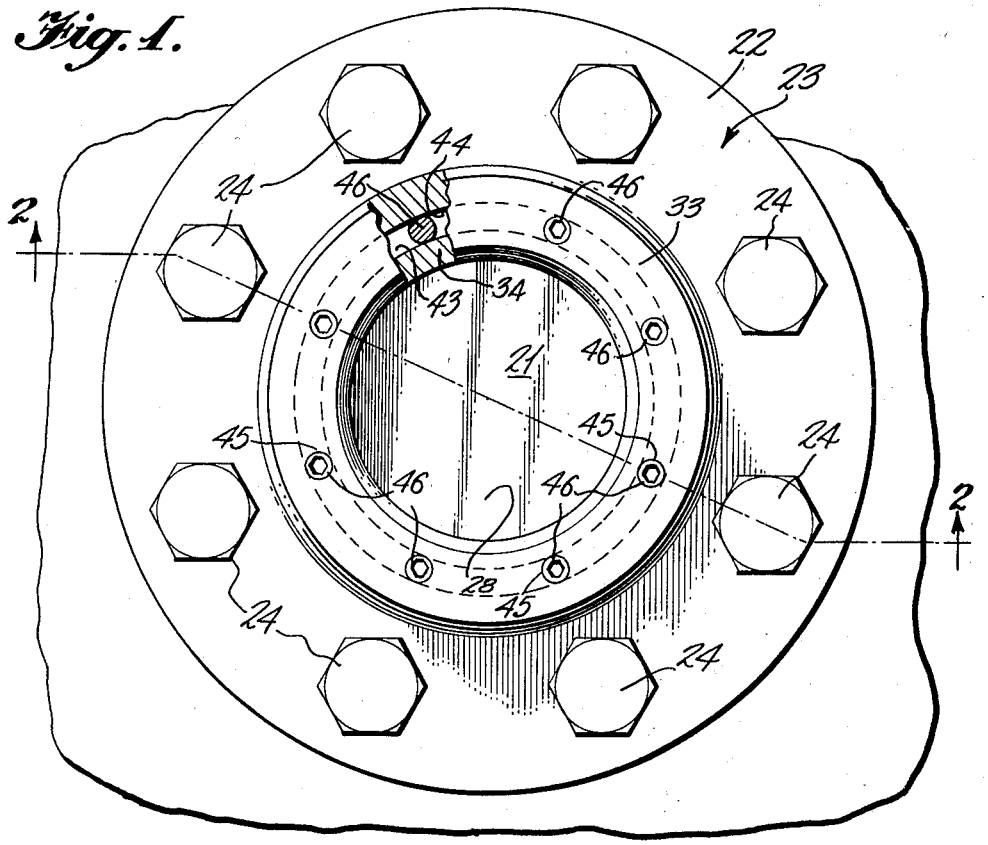
INVENTOR
Gene LeRoy
BY Mason, Fenwick & Lawrence
ATTORNEYS

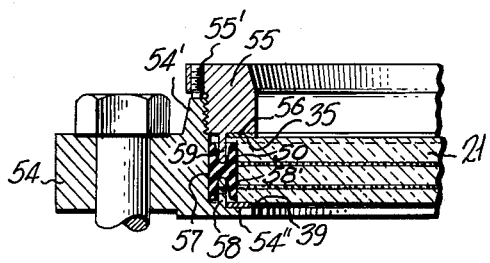
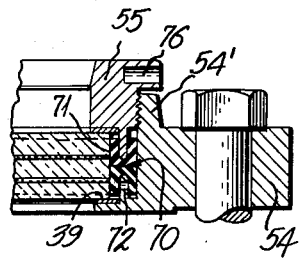
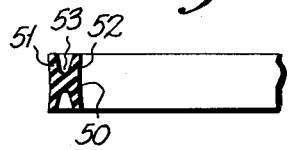
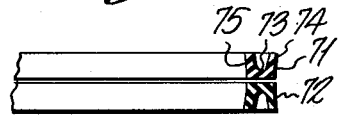
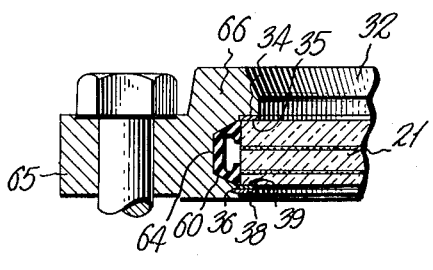
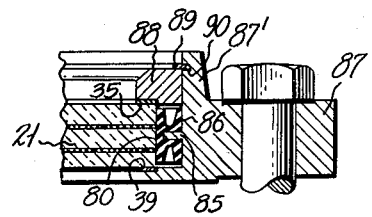
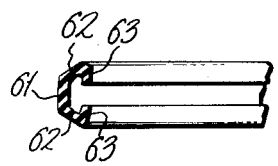
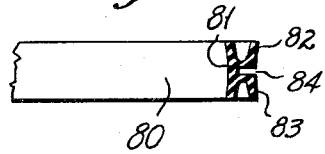

United States Patent Office 2,942,469
Patented June 28, 1960

2,942,469
SIGHT GLASS ASSEMBLY

Gene Le Roy, Charleston, W. Va., assignor to Haroy Co., a corporation of West Virginia Filed May 19, 1955, Ser. No. 509,565

1 Claim. (Cl. 73—334)

The present invention relates to sight glass assemblies for use with pressure and vacuum containers and the like.

Inspection or sight glasses for use with high pressure and vacuum apparatus have, as a rule, consisted of a single piece of glass of suitable composition to withstand the stresses due to corrosion, change of temperature, and other factors encountered in such apparatus, which piece of glass is supported in a mounting assembly including flange rings which are clamped against the outer and inner surfaces of the sight glass through manual tightening of flange bolts to seal the mounting assembly against leakage of pressure or vacuum. To insure a perfect seal, such excessive pressure must necessarily be directed against the outer and inner surfaces of the glass through tightening of the flange bolts that glass breakage is frequent. Further, in such an assembly, the uneven stresses which inevitably result from the practical inability to tighten the flange bolts with perfect uniformity results in a material reduction in the operating pressure of the sight glass.

Additional problems and practical difficulties have been encountered with sight glasses which, though made of one piece, comprise several layers of glass having different coefficients of thermal expansion and are fused into a unit, wherein the outer layers are under tension to increase their pressure rating, produced by different contraction of the fused layers during cooling. These sight glasses have proved to be too rigid due to their thickness and break easily when placed in holders.

An object of the present invention therefore is the provision of a novel sight glass assembly which minimizes stressing of the sight glass, other than that imposed by the internal pressure or vacuum, and thereby allows the glass to be operated at higher pressures.

Another object of the present invention is the provision of a novel sight glass assembly wherein a tight seal between the glass and the walls of the opening in the mounting assembly can be obtained with a minimum of mechanical pressure or strain on the glass.

Another object of the present invention is the provision of a novel sight glass assembly wherein the contact of the glass with the sealing gasket and the pressure on the glass are upon the edge or periphery of the glass rather than on the face of the glass and the degree of such pressure is responsive to the internal pressure or vacuum.

Another object of the present invention is the provision of a novel sight glass assembly wherein breakage of the glass due to unequal thermal expansion of the metal and glass are substantially obviated.

Other objects, advantages and capabilities of the present invention will become apparent from the following detail description, taken in conjunction with the accompanying drawings illustrating preferred embodiments of the invention.

Figure 1 is an elevational view of a sight glass assembly constructed in accordance with one embodiment of the present invention;

Figure 2 is a transverse section view taken along the line 2—2 of Figure 1;

Figure 3 is a fragmentary transverse section view taken from the position of the line 2—2 of Figure 1, but showing another embodiment of the sealing gasket and retainer ring constructed in accordance with the present invention;

Figure 4 is a fragmentary section view of the sealing gasket illustrated in Figure 3;

Figure 5 is a fragmentary transverse section view of still another form of sight glass assembly constructed in accordance with the present invention;

Figure 6 is a fragmentary section view of the sealing gasket illustrated in Figure 5;

Figure 7 is a fragmentary transverse section view of still another form of sight glass assembly constructed in accordance with the present invention;

Figure 8 is a fragmentary section view of the sealing gasket illustrated in Figure 7;

Figure 9 is a fragmentary transverse section view of still another form of sight glass assembly constructed in accordance with the present invention; and Figure 10 is a fragmentary section view of the sealing gasket illustrated in Figure 9.

Referring to the drawings, wherein like reference characters designate corresponding parts throughout the several figures, and particularly to Figures 1 and 2, the reference character 20 indicates generally the sight glass assembly of the type embodying the present invention, which includes a sight glass 21 supported in the flange ring 22 of a mounting assembly 23. The flange ring 22 is in accordance with conventional practice adapted to be fixed by means of a series of ring bolts 24 to the bounding wall portion 25 of a pressure or vacuum tank or the like surrounding an inspection opening 26. An annular connection gasket 27 is clamped between the flange ring 22 and the adjacent wall 25 of the tank to prevent leakage of pressure or vacuum at the interface between these components.

The preferred form of sight glass 21 employed in each of the various forms of mounting assembly construction hereinafter described consists of a bonded or laminated group of glass discs 28, 29 and 30 which are bonded together as indicated at 31 with a commercially available high temperature laminate formed of a chemical and heat resistant material. This high temperature laminate 31 is used to give full optical transparency between the glass discs 28, 29 and 30 and will remain flexible at high and low temperatures. The purpose of the laminate is to keep out dust from between the discs 28, 29 and 30 and not to add strength to the disc assembly. Commercially available plastics are not available which will remain clear, flexible, withstand high temperature, and hold any pressure or vacuum within the device to which the sight glass assembly is attached in case one of the glass discs should break.

The sight glass, to keep the thickness to a minimum and within practical limits, and to withstand the high temperatures to which such sight glasses are normally subjected, must be made of tempered glass, which is prestressed during formation of the glass discs to place the surface of the glass under compression and the interior under tension, thereby enabling the glass to withstand much greater pressures than conventional glass panels. Tempered glass, however, for some reason not positively identified is subject to rupturing during service even though operated well within the rated range of the tempered glass. This will happen to one piece in a few, or to one piece in several hundred, at unpredictable times after manufacture of the tempered glass, and may occur within several days of manufacture whether the tempered glass is in service or not. It is thought that one of the causes of such breakage is the impurities that are inherently present in commercial glass. During service, thermal shock may also be responsible for the incidence of breakage of the tempered glass disc nearest the interior of the pressure apparatus.

To eliminate, or reduce to a practical safe minimum, this rupturing of tempered glass while in service, which could cause great damage and a possible loss of life, two glass discs 28 and 29, formed of tempered glass, are optically ground and laminated together by the high temperature laminate 31, the thickness of each glass disc 28 and 29 being designed to withstand, by itself, the working pressure of the particular application required. A high factor of safety is thereby provided, since if one glass disc 28, 29 should break, the possibility of the other glass disc breaking at the same time would be very remote. Further, by using a high stress plastic for the high temperature laminate, the two bonded glass discs 28 and 29 would be more than twice as strong as corresponding unbonded glass discs.

In addition, for a corrosive service, a thinner disc 30 of corrosion resistant glass is laminated by the high temperature laminate to the other two or more glass discs. This type of corrosion resistant glass is made from annealed glass and has only one-fourth to one-fifth the strength of tempered glass. The reason for using this disc 30 of corrosion resistant glass is that tempered glass is not corrosion resistant and any corrosive action on the surface of tempered glass will destroy this surface and cause the glass to rupture. The additional lamini of tempered glass are necessary because the chemically treated corrosion resistant glass can not be tempered to obtain high strength and heat resistance.

Since the corrosion resistant annealed glass will have a different thermal coefficient of expansion, the high temperature laminate 31 bonding the same to the intermediate tempered glass disc 29 must remain flexible and pliable throughout the range of temperatures encountered in the associated apparatus to prevent fracture of the glass from this effect. Examples of commercially available high temperature laminates which may be used for the laminate 31 to bond the glass discs together are silicon resin manufactured by Dow Chemical Company for such applications, Teflon manufactured by Du Pont, Fluorothene manufactured by Union Carbide and Chemical Company and Kel-f manufactured by M. W. Kellogg Company.

In the form of mounting assembly 23 illustrated in Figures 1 and 2 of the drawings, the outer end of the sight opening 32 in the flange ring 22 is bounded by an outwardly projecting annular rim 33 having a smaller internal diameter than the diameter of the glass discs 28, 29 and 30. The annular rim 33 terminates inwardly in a shoulder 34 extending to a diameter slightly greater than that of the glass discs 28, 29 and 30, which provides a support for the outer cushion gasket 35 against which the outermost tempered glass disc 28 is adapted to rest.

The inner end of the sight glass opening 32 in the mounting assembly 23 is of a slightly greater diameter than that of the glass discs 28, 29 and 30 and is provided closely adjacent to the inner surface of the flange ring 22 with an annular groove 36 having a beveled shoulder 37, which is adapted to receive a metallic snap ring 38 which provides a support for an inner cushion gasket 39 so that the cushion gaskets 35 and 39 engage but do not impose a stress upon the peripheral portions of the exposed faces of the outermost and innermost glass discs 28 and 30 to retain the same within the sight glass opening 32. The snap ring 38 is also provided with a beveled edge to engage the beveled wall 37 of the annular groove 36 to assist in locating the snap ring within the groove.

The group of sight glass discs 28, 29 and 30 are sealed against leakage of air along the peripheries of the glass discs by means of a compression gasket 40 which is mounted in such a way that it exerts pressure only on the peripheries of the glass discs and in the direction of the principal planes of the glass discs. The compression gasket 40 is constructed of an elastic material such as rubber, fibre or the like, in annular form and of isosceles trapezoidal cross section providing outwardly converging inclined sides 41 and 42. A split metallic compression ring 43 is provided in an annular opening 44 provided in the rim portion 33 of the flange ring 22 which opens into the channel for accommodating the compression gasket 40. As illustrated in Figure 2, the lower face of the compression ring 43 is inclined complementary to the upper inclined side 42 of the compression gasket 40 to bear thereon uniformly throughout the circumference of the compression gasket so as to exert a compressive force thereon and force the gasket 40 intimately against the glass disc peripheries. A plurality of bores 45 of circular cross section extend from the annular channel 44 and are threaded to accommodate compression ring adjusting screws 46 having Allen wrench sockets or like formations in the exposed ends thereof to permit manual adjustment of the adjusting screws 46 and corresponding pressure upon the compression gasket 40.

By this construction, the use of a separate retainer ring for facilitating introduction and mounting of the glass discs within the sight glass opening and the exertion of any stresses on the faces of the glass discs perpendicular to their major planes is obviated. The unit is assembled by inserting the outer cushion gasket 35 into the sight glass opening 32 from the inner end thereof to position the same against the shoulder 34 and positioning the comperssion gasket 40 in its accommodating recess. The bonded glass discs 28, 29 and 30 are then inserted through the same end of the sight glass opening and positioned against the cushion gasket 35, the inner cushion gasket 39 is inserted into contact with the marginal surface of the glass disc 30 and the split ring 38 is seated into its accommodating annular groove 36. Thereafter, the split compression ring 43 which was previously inserted into its accommodating annular channel 44 in two parts, may be adjusted by rotation of the compression ring adjusting screws 46 to apply uniform pressure against the upper inclined side 42 of the compression gasket 40 to deform the gasket into intimate sealing contact with the peripheries of the glass discs 28, 29 and 30.

The remaining modifications illustrated in Figures 3 to 10 inclusive incorporate a floating gasket design wherein the compression or sealing gasket is installed in the assembly under a very slight diametric compression to prevent initial leakage of pressure, but which imposes a negligible mechanical stress upon the sight glass. By this expedient, wherein no mechanical stresses are applied to the sight glass before the working or test pressures are applied, it is thought that the sight glass would be subjected to even less chance of rupturing prior to or during service. In these modified forms, the gasket is formed in such a way and is subjected to the internal pressure within the apparatus to which the sight glass assembly is applied in such a manner that the sealing pressure applied to the peripheries of the sight glass discs varies in accordance with the internal pressure to continuously maintain a perfect seal and to provide reduced stresses applied to the peripheries of the sight glasses when the working pressures are low. In the embodiment illustrated in Figures 3 and 4 an H-shaped annular compression gasket 50 of rubber, fibre or like resiliently deformable material is provided to surround and seal the peripheries of the glass discs forming the sight glass 21 against leakage of pressure or vacuum. The gasket 50 has substantially parallel legs 51 and 52 which arch slightly away from each other when the gasket 50 is free of stress, which legs are interconnected by an integral web 53. The flange ring 54 associated with the compression gasket 50 differs from the construction shown in Figures 1 and 2 in that the annular lip 54' bounding the outer end of the sight glass opening is internally threaded to receive a retainer ring 55 therein having a shoulder 56 against which the outer cushion gasket 35 is supported, which in turn bears against the marginal surface of the outermost glass disc forming the sight glass 21. The flange ring 54 is bored to a substantially greater diameter than the sight glass 21 to provide an annular chamber between the sight glass periphery and the cylindrical end wall 57 bounding the sight glass opening to accommodate the compression gasket therein. Annular extensions 58 and 59 of the flange ring 54 and retainer ring 55 are aligned with each other and project toward each other into the compression gasket housing chamber to extend between the legs 51 and 52 of the compression gasket 50 into engagement with the web 53 thereof and thereby hold the compression gasket 50 against longitudinal movement. The inner end of the sight glass opening defined in the flange ring 54 is provided with an inwardly extending annular shoulder 54" for supporting the inner cushion gasket 39 against the marginal inner surface of the sight glass 21. A weep hole 58a is provided in the annular extension 58 projecting from the flange ring 54 into the compression gasket housing chamber to permit the pressure against the inner surface of the sight glass 21 to leak by the inner cushion gasket 39 and be applied against the adjacent walls of the gasket leg portions 51 and 52 surrounding the annular extension 58 and thereby compress the leg portions 51 and 52 against the end wall 57 of the flange ring 54 and the periphery of the sight glass 21 in accordance with the pressure existing in the tank or apparatus with which the sight glass assembly is associated. A locking set screw 55' is threadingly supported in the retainer ring 55 to bear upon the rim 54' of the flange ring 54 and hold the retainer ring 55 against rotation relative to the flange ring 54 when the desired degrees of adjustment is achieved.

In the embodiment illustrated in Figures 5 and 6, a C-shaped annular compression gasket 60 of rubber, fibre or like resiliently deformable material having a web 61 bounded by oppositely inclined legs 62 terminating in inwardly projecting lips 63 is adapted to be seated in a compression gasket housing channel 64 of isosceles trapezoidal cross section opening into the sight glass accommodating opening 32 of a flange ring 65 with the lips 63 bearing against the sight glass periphery. The flange ring 65 is substantially identical to the flange ring 22 described in connection with Figures 1 and 2, except that no annular channel 44 or threaded circular bores 45 are provided since the compression ring 43 and compression ring adjusting screws 46 are omitted in this embodiment of Figures 5 and 6. Instead, the rim 66 bounding the sight glass opening 32 in the flange ring 65 is uninterrupted and is provided with a shoulder 34 for supporting the outer cushion gasket 35 in contact with the outer marginal surface of the sight glass 21. The flange ring 65, as in the case of the flange ring 22, is likewise provided with an annular groove 36 for receiving a metallic snap ring 38 supporting the inner cushion gasket 39 in contact with the inner marginal surface of the sight glass 21. In this arrangement, the internal pressure of the pressure or vacuum apparatus applied against the inner surface of the sight glass 21 leaks past the inner cushion gasket 39 and into the hollow defined between the legs 62 of the C-shaped gasket 60 to increase the pressure of the gasket lips 63 against the sight glass periphery and vary the sealing pressure in accordance with the pressure conditions in the pressure or vacuum apparatus. Additionally, the divergence of the inclined legs 62 of the C-shaped gasket 60 in its free, unstressed shape is greater than that of the inclined walls of the gasket housing channel 64 so that the C-shaped gasket 60 is continuously under a slight state of compression when it is fitted into the channel 64.

Figures 7 and 8 illustrate another modified form wherein the compression gasket 70 is formed of a pair of U-shaped annular members 71, 72 of rubber, fibre or like resiliently deformable material, wherein the U-shaped gasket components 71 and 72 are disposed back to back. Each of the gaskets 71, 72 comprise a web 73 from each end of which extend integral substantially parallel legs 74 and 75. The mounting assembly construction illustrated in Figures 7 and 8 as employed with the compression gasket 70 is identical with that described in connection with Figures 3 and 4 of the drawings, the fragmentary section view illustrated in Figure 7 being taken from a position which likewise shows a spanner wrench hole 76 which extends radially inwardly from an edge of the retainer ring 55 to facilitate threading of the retainer ring 55 into the internally threaded opening of the flange ring rim 54'. As is shown in Figure 7, the annular extensions 58 and 59 extending into the compression gasket housing channel from the flange ring 54 and retainer ring 55, respectively, fit into the recesses provided between the legs 74, 75 of the gasket components 71 and 72 to hold the gaskets against longitudinal displacement. The legs 74 and 75 of the gasket components 71 and 72 diverge slightly so that the gasket components 71 and 72 are placed under a slight state of compression by the parallel end wall 57 and sight glass periphery when the gasket unit 70 is positioned within the flange ring 54.

Another embodiment is illustrated in Figures 9 and 10, wherein a K-shaped gasket 80 of rubber, fibre or like resiliently deformable material is provided to surround and seal the peripheries of the glass discs forming the sight glass 21. The K-shaped gasket 80 comprises a vertical leg 81 of substantially the thickness of the sight glass unit 21 adapted to bear against the sight glass periphery and a pair of oppositely directed L-shaped extensions 82 and 83 integral with the leg 81 and projecting therefrom in slightly spaced relation relative to each other to provide a slot 84 therebetween for receiving an annular rib 85 projecting from the end wall 86 of the compression gasket housing channel in the flange ring 87. The annular rib 85 serves to hold the gasket 80 against longitudinal displacement relative to the sight glass 21. The flange ring 87 employed with this embodiment is similar to that illustrated in Figures 3 and 4 except that the rim 87' thereof is provided with an opening forming the outer end of the sight glass accommodating opening which is of the same diameter as the end wall 86 of the compression gasket housing channel, and a retainer ring 88 is adapted to be fitted into the opening in the rim 87' and held in position by a split bevelled snap ring 89 which is received in a complementary bevelled annular groove 90 in the flange ring rim 87'. The usual outer and inner cushion gaskets 35, 39 are supported by the retainer ring 88 and the flange ring 87 in contact with the marginal surfaces of the sight glass 21. The operation of the K-shaped gasket 80 to increase the sealing pressure on the periphery of the sight glass 21 in response to increases in the pressure within the apparatus with which the sight glass is associated or the difference between such pressure and outside pressure is the same as that described in connection with the embodiment illustrated in Figures 3 and 4.

While several embodiments of the invention have been shown and described, it is apparent that other various modifications may be made in the invention without departing from the spirit and scope thereof, and it is desired, therefore, that only such limitations shall be placed thereon as are imposed by the prior art and are set forth in the appended claim.

I claim:

A sight glass assembly for high pressure vessels and the like comprising a mounting ring adapted to be secured adjacent the periphery thereof to the associated pressure vessel overlying an inspection opening in the pressure vessel and having a central sight glass accommodating bore to be aligned with said inspection opening, said mounting ring having an integral annular lip portion extending around the outer end of said bore and projecting into the same to provide an inwardly facing annular shoulder lying in a plane disposed perpendicular to the axis of said sight glass bore, a cylindrical sight glass supported within said bore with the marginal outer surface portion thereof lapping said lip portion, said mounting ring having an annular channel surrounding the sight glass periphery in communication throughout with said bore including inclined inner and outer side walls diverging toward said axis and an annular chamber opening through the outer side wall and extending axially outwardly of said ring, a resiliently deformable annular sealing gasket having opposite surfaces inclined in correspondence with said annular channel side walls seated within said channel, a rigid gasket adjusting ring disposed within said annular chamber having a bevelled surface forming said outer side wall contacting the adjacent inclined surface of said sealing gasket, a plurality of screws projecting from the outer surface of said mounting ring threaded in said mounting ring and engaging said gasket adjusting ring for forcing the adjusting ring against said sealing gasket to compress the sealing gasket into intimate sealing contact with the sight glass periphery; said mounting ring having an annular groove opening into said bore adjacent the inner surface of said mounting ring, the wall of said groove nearest said inner surface being inclined toward the axis of said bore and toward said inner surface, a split retaining ring removably seated in said groove and projecting into said bore in overlapping relation with the marginal portions of the inner sight glass surface and forming an outwardly facing shoulder overlapping the same, said split retaining ring having an inclined surface complementary to the inclined wall of said groove, and the annular cushion gaskets disposed between said shoulders and the adjacent marginal portions of said sight glass surfaces for resiliently positioning the sight glass between said shoulders.

References Cited in the file of this patent

UNITED STATES PATENTS

| | | |
|---|---|---|
| 1,380,080 | Sargent | May 31, 1921 |
| 2,041,132 | Johnson | May 19, 1936 |
| 2,071,411 | Lamesch | Feb. 23, 1937 |
| 2,165,052 | Hering | July 4, 1939 |
| 2,461,989 | Le Roy | Feb. 15, 1949 |
| 2,470,925 | Fredrickson | May 24, 1949 |
| 2,509,436 | Isenbarger | May 30, 1950 |
| 2,681,034 | Mannion | June 15, 1954 |
| 2,768,108 | Carnall et al. | Oct. 23, 1956 |